United States Patent
Peña et al.

(10) Patent No.: US 12,448,157 B1
(45) Date of Patent: Oct. 21, 2025

(54) DRONE-BASED EMERGENCY BEACON SYSTEM FOR VEHICLES

(71) Applicant: UIPCO, LLC, San Antonio, TX (US)

(72) Inventors: Ric M. Peña, Boerne, TX (US); Charlotte Thomas Creech, San Antonio, TX (US); Bianca Gonzalez, Fair Oaks Ranch, TX (US); David Joaquin Harris, San Antonio, TX (US); Nickolaus Wayne O'Neal, Adkins, TX (US); Jennifer Marie Chandler-Bradley, Tampa, FL (US); Brandy Lynne Hartwig, Colo, IA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/680,269

(22) Filed: May 31, 2024

Related U.S. Application Data

(60) Provisional application No. 63/601,926, filed on Nov. 22, 2023.

(51) Int. Cl.
*B64U 10/60* (2023.01)
*B64U 70/93* (2023.01)
*B64U 101/55* (2023.01)

(52) U.S. Cl.
CPC ............. *B64U 10/60* (2023.01); *B64U 70/93* (2023.01); *B64U 2101/55* (2023.01)

(58) Field of Classification Search
CPC ...... B64U 10/60; B64U 70/93; B64U 2101/55
See application file for complete search history.

(56) References Cited

U.S. PATENT DOCUMENTS

| | | | |
|---|---|---|---|
| 10,812,960 B2 * | 10/2020 | Weinfield | H04W 4/44 |
| 11,579,633 B1 * | 2/2023 | Haslam | B64U 10/13 |
| 12,006,063 B2 * | 6/2024 | Khalid | B64D 45/00 |
| 2018/0312276 A1 * | 11/2018 | Miller | B64U 10/14 |
| 2020/0231279 A1 * | 7/2020 | Buyse | B64U 10/60 |
| 2020/0385116 A1 * | 12/2020 | Sabripour | G08G 5/723 |
| 2021/0047030 A1 * | 2/2021 | Corey | B64C 27/50 |
| 2021/0365692 A1 * | 11/2021 | Hashiguchi | B60R 1/28 |
| 2022/0034633 A1 * | 2/2022 | Yeshurun | G05D 1/101 |
| 2022/0355840 A1 * | 11/2022 | Tenne | H04W 4/38 |
| 2024/0241520 A1 * | 7/2024 | Araujo | B64U 50/37 |

* cited by examiner

*Primary Examiner* — Justin M Benedik
(74) *Attorney, Agent, or Firm* — Plumsea Law Group, LLC

(57) ABSTRACT

A method and system of intelligently deploying a drone above a vehicle in order to signal and alert emergency responders. The vehicle includes a compartment in which the drone is stowed until specific conditions are detected by the vehicle's onboard computing system. When a collision, breakdown, or other emergency event is detected, the onboard computing system causes the drone to be released from the compartment and move into a position above the vehicle. Sensors for the drone collect data that can be used by the onboard computing system to generate instructions for the drone to maintain a generally constant position relative to the vehicle and ensure responders can accurately pinpoint the location of any injured passengers. The drone can include lights and audio that can increase the likelihood of the beacon being noticed.

20 Claims, 10 Drawing Sheets

DRONE-BASED EMERGENCY BEACON SYSTEM FOR VEHICLES

CROSS-REFERENCE TO RELATED APPLICATION

This application claims the benefit of U.S. Provisional Patent Application Ser. No. 63/601,926 filed on Nov. 22, 2023 and titled "DRONE-BASED EMERGENCY BEACON SYSTEM FOR VEHICLES", the disclosure of which is incorporated by reference herein in its entirety.

TECHNICAL FIELD

The present disclosure generally relates to methods and systems for providing emergency signals, and specifically to providing emergency signals via a drone automatically deployed from a vehicle that may serve as a persistent beacon for emergency responders.

BACKGROUND

Automobiles are becoming more sophisticated with each new model year. For example, modern vehicles are being designed with safety systems to reduce collisions and mitigate those collisions that do occur. Collision avoidance systems include a wide range of technologies spanning from anti-lock brakes to headlight tracking systems to obstacle avoidance systems. Collision mitigation systems include things like interior and exterior airbag deployment systems, pre-tensioning seat belts, fuel line cutoff systems, and emergency response alert systems.

Despite the presence of such systems, vehicles continue to experience serious collisions and damage, such as when drivers run their vehicle off a road, impact with trees and other large structures, or rollover. These incidents can occur in isolated areas, or at times when there is little if any passersby who might assist. In some cases, drivers and passengers may become trapped inside their vehicles or be otherwise too injured to seek help or leave the accident scene. It may be necessary for the vehicles to provide some indication to search and rescue teams that they require assistance and/or need to be evacuated to a medical center. While flares can provide one-time signaling, however these signals may not be detected if the search and rescue teams are not in the vicinity of the resident when the flare is deployed.

There is a need in the art for a system and method that addresses the shortcomings discussed above.

SUMMARY

In one aspect, a method of triggering deployment of a drone-based beacon from a vehicle is disclosed. The method includes a first step of receiving, at an onboard computing system for the vehicle, first data. A second step includes determining, at the onboard computing system, that the first data matches a condition corresponding to a triggering event. The method also includes a third step of generating, at the onboard computing system and in response to determining a triggering event has occurred, an activation signal that causes deployment of a drone beacon from an exterior of the vehicle.

In another aspect, a vehicle beacon system is disclosed. The system includes (1) a vehicle with an onboard computing system, and one or more collision detection sensors; (2) a drone beacon housed in a compartment formed along an exterior of the vehicle; and (3) a tether cable connecting the onboard computing system to the drone beacon.

In another aspect, a system for triggering deployment of a drone-based beacon from a vehicle includes a processor and machine-readable media. The machine-readable media include instructions which, when executed by the processor, cause the processor to (1) receive, at an onboard computing system for the vehicle, first data; (2) determine, at the onboard computing system, that the first data matches a condition corresponding to a triggering event; and (3) generate, at the onboard computing system and in response to determining a triggering event has occurred, an activation signal that causes deployment of a drone beacon from an exterior of the vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
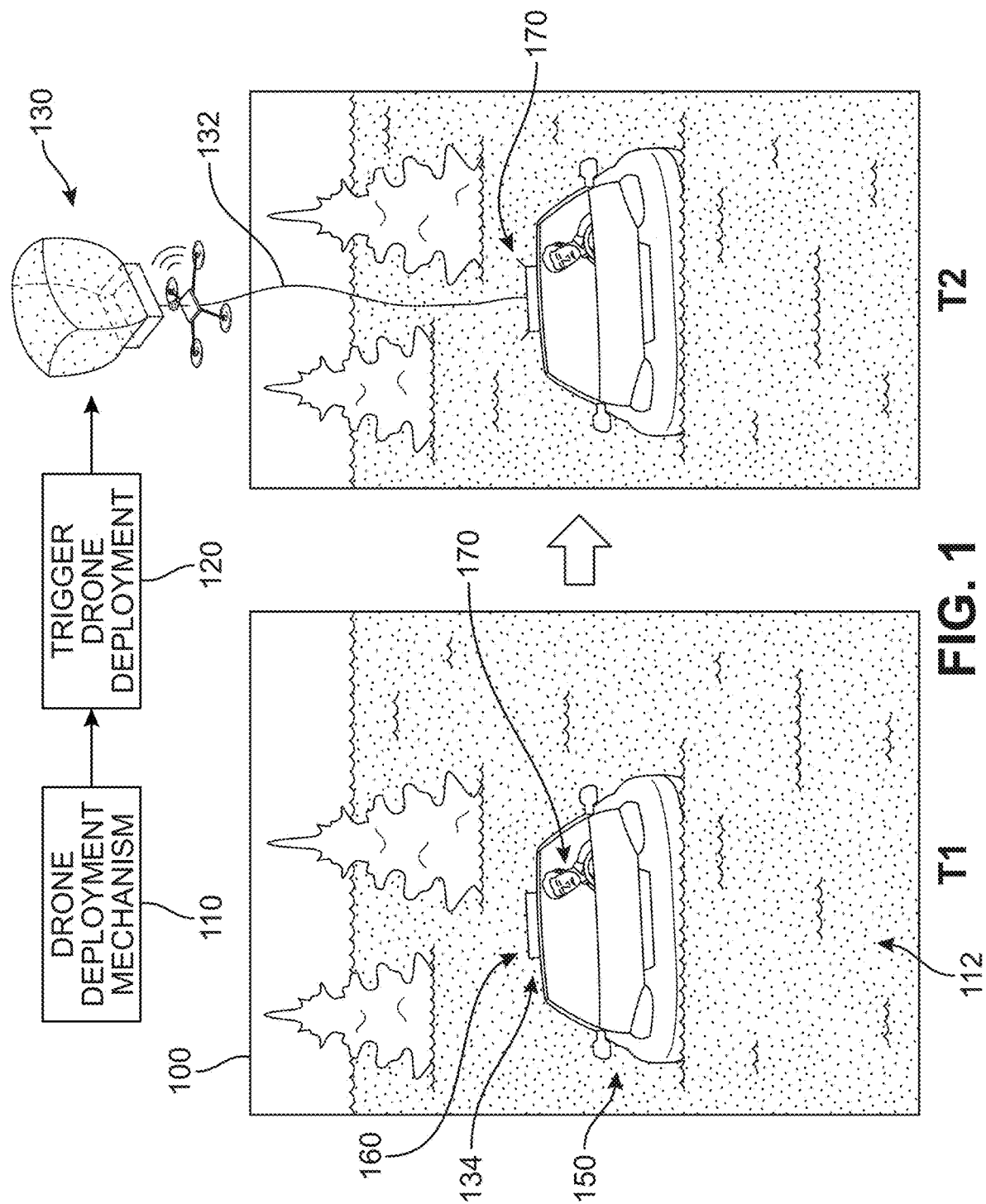
FIG. 1 is an example scenario in which the vehicle beacon system may be implemented, according to an embodiment.

The embodiments provide systems and methods for drone-based beacons that may deployed from a ground-based vehicle (e.g., a car, truck, etc.) following an accident. In some embodiments, the proposed systems can also be incorporated with water-vehicles such as boats. Upon deployment, the drone may determine a location of the driver or passenger ejected from the ground vehicle. In some embodiments, the drone may indicate the location of the driver or passenger, for example, by hovering over the person or pointing toward their location. In one example, the drone may be tethered to the ground vehicle and powered by the ground vehicle. The tether may help the drone to stay in the vicinity of the member for an extended period of time until the member can be located by emergency workers.

Additional components, such as a processor or other equipment, may also be located in the ground vehicle, which may reduce a weight of the drone by performing operations on the ground and limiting the drone's operations to surveillance and signaling. In some embodiments, the drone may include a camera as well as object detection software for locating the driver or the passenger in a case that these persons are separated from the vehicle. For example, the drone may include one or more motors for maneuvering over a person requiring assistance. In some cases, the drone may include a light for drawing attention to the person requiring assistance. In different embodiments, the drone may comprise a "balloon"-type drone. For example, the drone may automatically inflate with helium gas following an accident. Furthermore, in some cases, the drone can be equipped to perform a search and detection of any emergency vehicles in an area. In such cases, the drone may include audio and visual cues for drawing the emergency crew's attention to the driver or passenger. For example, the drone may include a bright light or spotlight, which may be shined toward the driver or passenger to indicate their precise position. Such a system can be employed to facilitate search and rescue teams. The proposed embodiments can be particularly beneficial to those persons who may be thrown from a vehicle or stuck in a ground vehicle in a concealed location, such as beyond a shoulder of a road or in a ravine.

In different embodiments, the disclosed system and methods include provisions for automatically detecting when a ground vehicle (e.g., car) collision has occurred and, in response, deploying an aerial drone-based beacon that is stored in a compartment formed along an exterior of the vehicle. The system and method can use sensed information from ground/aerial sensors, sensors from a mobile device (such as a smartphone) that is in the ground vehicle at the time of the impending collision, and/or from roadway sensors to detect specific conditions indicating a high-impact collision has occurred. By analyzing the sensed information, the system can determine that the drone should be deployed or otherwise activated. By automatically deploying such a device in response to a collision, the system and method can help reduce the trauma to the passengers and facilitate and expedite the presence of essential service personnel at the accident site. For purposes of this application, the use of the term "vehicle" on its own refers to ground-based or water-based vehicles such as cars and boats, while the term "aerial vehicle" refers to drones.

For purposes of clarity, an overview of one embodiment of the proposed systems and methods is illustrated with reference to FIG. 1. FIG. 1 depicts a scenario in which an embodiment of a vehicle beacon system may be employed. In FIG. 1, a first car 150 with a driver 170 was driving in rainy, wet, and slippery conditions in a first area 100. In this case, the first car 150 skidded off the road and has slid into a creek 112. Furthermore, the first car 150 includes an emergency beacon mechanism stored in an enclosure 160 installed along an exterior surface of the vehicle. In this case, the enclosure 160 is disposed on the vehicle's roof, though in other cases any exterior surface of the vehicle can be used as a substrate for the apparatus. At a first time T1, the vehicle's onboard sensors have just detected the vehicle's sudden collision and/or immersion in fluid. In different embodiments, the enclosure 160 is configured for release/open upon detection of a collision or other accident. The vehicle beacon system determines the sensor data for vehicle conditions received around this time indicates that an accident is occurring (referred to herein as a triggering event 110).

In response, at a second time T2, the enclosure 160 can transition automatically from a sealed state 134 to an opened state 136, following which a response 120 is executed by the vehicle beacon system in which a first drone 130 stowed in the enclosure 160 is automatically deployed. In some embodiments, once the system has been activated, a panel or other seal of the enclosure 160 can 'pop' open, allowing the drone to move outward or launch in a distal direction (away from the vehicle via a deployment mechanism such as a spring(s) mechanism, compressed air system, or other such mechanism. The panel can be opened by the system to permit the release of the drone that was stored within the enclosure compartment provided or formed along the exterior of the vehicle. In some embodiments, the first drone 130 can travel away from the first car 150 while retaining a physical connection with the vehicle's onboard computer, for example via a retractable tether 132. The first drone 130 can then initiate a monitoring operation by which data associated with the driver 170 and/or the first car 150 can be collected, including image/sensor data. Furthermore, the first drone 130 can rise to a sufficiently high altitude so as to be visible to third-parties and/or to serve as a beacon to the site of the accident. In some embodiments, once an activation signal from the onboard computing system causes the enclosure/container to open, the drone can be automatically activated in response to detection that the container is open/unsealed. Thus, the opening of the compartment can be followed immediately by the release of the drone. For example, a gas storage container can be switched from a closed/sealed state to an opened/release state, and begin to fill the gas-bag and cause the drone to rise upward. In another example, the vehicle beacon signal can switch motors for the drone from an off state to an on state in response to a system determination that the compartment has successfully opened, allowing the drone to rise out of its housing and into the air above.

As will be discussed in greater details below, in different embodiments, a drone employed by the proposed systems can refer to an unmanned aerial vehicle (UAV) capable of flight and navigation. For example, in some cases, the UAV can include one or more rotors, which operate in response to signals from an onboard computing system or a vehicle computing system with which it communicates either wirelessly or over the tether. The onboard computing system can include components, including processor, memory, sensors, a communication system, a navigation system, an image processing system, rechargeable battery, and a solar tracker system. In some embodiments, the drones may be autonomous. That is, the drones may be programmable to travel to designated positions relative to the vehicle from which it has been deployed.

Memory may comprise a non-transitory computer readable medium. Instructions stored within memory may be executed by the one or more processors. In addition, each drone may include a communication system such as a radio or other provisions for communicating using one or more communication methods. In particular, a communication system includes provisions for communicating with other nearby devices and/or cloud server over a network. For example, each communication system could include a Wi-Fi radio, a Bluetooth radio, other NFC components, and/or a cellular network radio. A drone can include provisions for communicating with, and processing information from, a cloud-based server as well as other devices in the home network. In one example, a navigation system can be incorporated in the onboard computing system. In some embodiments, the navigation module that can further include a GPS receiver for receiving GPS information that can be used to determine a GPS location for the drone and the car. In addition, the navigation module can receive path instructions from a ground system (e.g., the vehicle's computing system) and process and execute the instructions to direct the UAV along a pre-designated path.

In addition, in different embodiments, a drone may also include sensors for measuring orientation, altitude, and/or acceleration. For example, a drone can include a gyroscope, an altimeter, and an accelerometer. In some embodiments, drone can include an altitude and heading reference system (AHRS). Using these devices, the orientation, heading, and height of the aerial vehicle (and the associated car) can be determined. This information, when used with a GPS location for the aerial vehicle, can be used to infer the location of the drone and its position relative to the car below, as well as its position relative to nearby emergency services. The drone may further include a camera for capturing images and other light-based data for receipt by the image processing system. Camera may comprise any kind of camera, including any kind of digital camera, as well as a camera configured to capture infrared, x-ray, ultraviolet, and visible light signals.

In some embodiments, a drone's onboard computing system and/or the car's onboard computing system further includes an image capture and processing system, also referred to simply as image processing system. Image processing system may be used to store, process, and transmit image information. Additionally, in some cases, image processing system can receive navigation other coordinate/navigation information about one or more locations. To facilitate these tasks, image capture and processing system may include one or more processors as well as memory. Memory can store instructions for programs that facilitate storing, processing, and transmitting image information. The processed image data can be provided to navigation module to execute a path through lower airspace as the drone travels around the vicinity of the car.

In different embodiments, the drone can include a UAV communication system for communication with a ground communication system, such as the car's computing system, or an emergency responder service computing system. These communication components enable information to be transmitted between the systems via a network or signal processing. Thus, the type of communication components used in each communication system can be selected according to the type of communication channel used. In some cases, a cellular network could be used so that each communication system includes a cellular radio or other component that enables cellular communication. Using a cellular network may enable information to be exchanged while drone is in the air where Wi-Fi or other networks might be unavailable. In other cases, networks could comprise any kind of local area network and/or wide area network. In some cases, network may be a Wi-Fi network. In some embodiments, the ground system and drone are connected by network. In different embodiments, one or more components of drone could be disposed within a single computing device.

In different embodiments, the ground system (not shown) comprises a computing system with one or more processors and memory. The ground system includes provisions (e.g., a ground communication system) for communicating with various other systems as well as for processing image or other data received from UAVs.

In some embodiments, the drone can include a communications interface, which may be used to communicate with a relay control device, such as relay control device, either directly or through a formed wireless ad hoc network. In some examples, a UAV can receive control signals from the relay control device. In some examples, a UAV can send signals to the relay control device regarding collected data and/or other types of devices and network status. In different embodiments, UAVs may include flight controllers, such as 3DR APM®, 3DR Pixhawk®, DJI A2®, DJI Ace One®, DJI Naza-M V2®, and DJI WooKong®. The flight controller of a UAV may control the UAV's propulsion systems and control surfaces to execute autonomously flight plans. In addition, a UAV can include a sensor package. A sensor package can include, but is not limited to, navigation sensors (e.g., GNSS receivers), cameras, environmental sensors, surface mapping sensors, and payload equipment.

Figure 2:
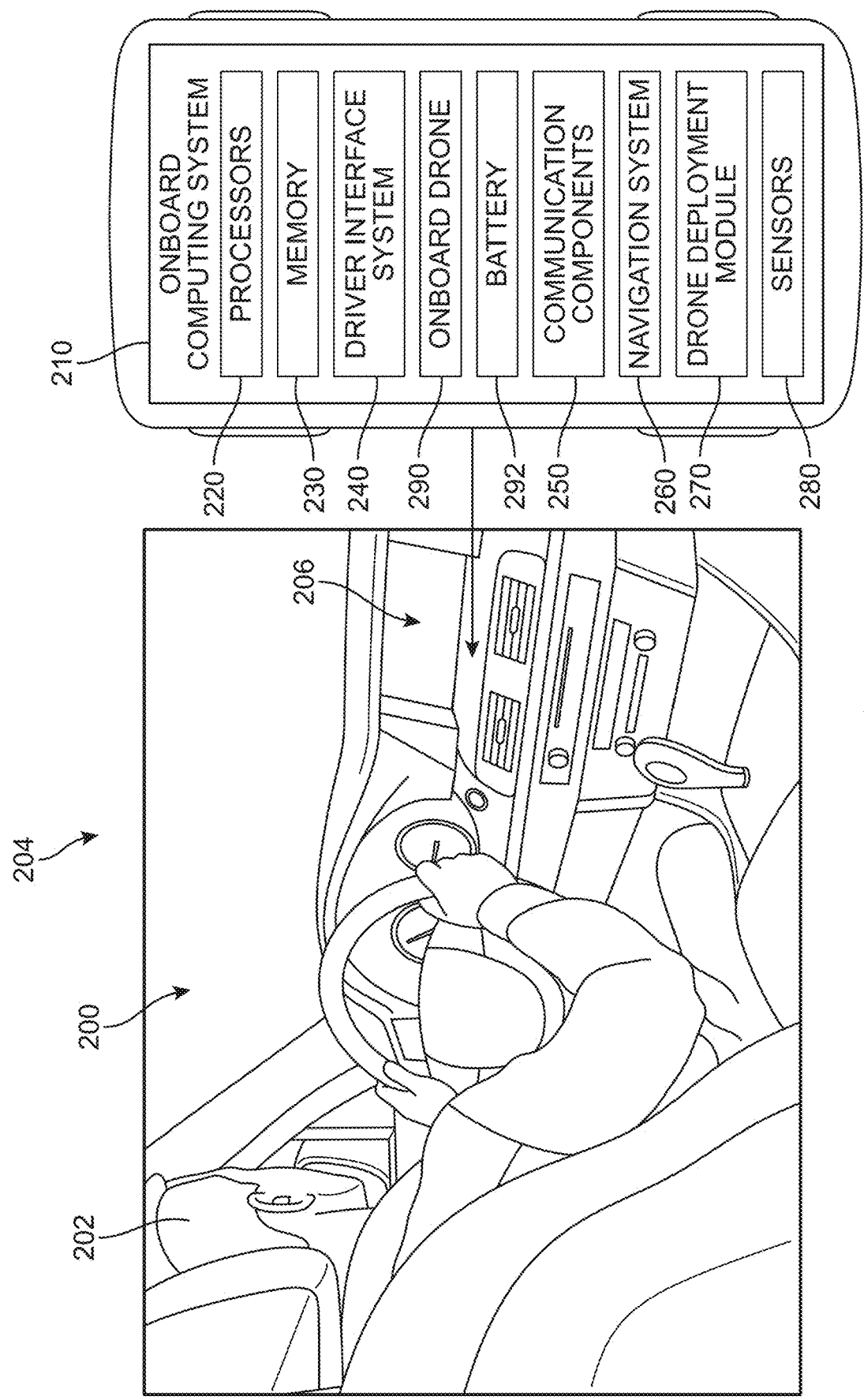
FIG. 2 is an example of an interior view of a motor vehicle alongside a schematic of a vehicle computing system, according to an embodiment.

Moving now to FIG. 2, additional details regarding embodiments of a vehicle beacon system 204 are provided. In this drawing, a view of an interior of one embodiment of a motor vehicle 200 (also referred to herein as the second car) is illustrated. The vehicle 200 may include an onboard computing system 210. Onboard computing system 210 may comprise a single computing device, or a network of multiple computing devices. Onboard computing system 210 could be associated with one or more electronic control units (ECUs). As seen in FIG. 2, onboard computing system 210 includes one or more processors 220 and memory 230. Memory 230 may comprise a non-transitory computer readable medium. Instructions stored within memory 230 may be executed by the one or more processors 220.

For clarity, some of the vehicle systems of the embodiments are depicted as residing within a single onboard computing system 210. However, it may be appreciated that in some embodiments, one or more of these systems could be separate and may not comprise part of a single computing system. Instead, two or more systems could each comprise their own processors and/or memory, as well as components facilitating communication with other systems.

Vehicle 200 may also include one or more communication components 250. Communication components 250 may include cellular network components for communicating over cellular networks, Wi-Fi components for communicating over Wi-Fi networks, and other communication components.

Vehicle 200 may also include a navigation system 260. In some cases, navigation system 260 includes a GPS receiver that can receive GPS information. In other cases, navigation system 260 can include other receivers capable of receiving global or local positioning information. Additionally, navigation system 260 may comprise maps and/or information from other kinds of geographic information systems (GIS) that can be used to generate navigation routes for a driver.

Vehicle 200 may also include one or more vehicle sensors 280. Vehicle 200 may also include an onboard diagnostics (OBD) system, which is not shown for clarity. An OBD system may track and process various vehicle sensor information. In some cases, one or more systems of vehicle 200 could retrieve sensory data from the OBD system rather than directly from the sensors themselves. For example, sensors can include microphones, cameras, motion sensors, status sensors, and/or crash sensors. It may be appreciated that different sensors can be used with various vehicles, and a single vehicle need not include all of the following sensors.

Generally, microphones could include any kind of microphones known in the art for use in vehicles or mobile devices. A vehicle could include microphones embedded in a dashboard, in a rearview mirror, in the grill, or other locations. Microphones in a vehicle may be useful for speakerphone functionality and for communicating audibly with an onboard intelligent voice assistant. In some embodiments, microphones could be used to detect sounds associated with collisions, such as the sound of breaking glass and/or the sound of crushing metal. In addition, cameras could include any kind of cameras known in the art for use in vehicles or mobile devices. A vehicle could include cameras in a dashboard or rearview mirror, or adjacent to the side bumper(s), for example. In some embodiments, cameras could be used to detect collisions. In some cases, vehicle onboard computing system 210 could include machine learning algorithms trained to detect features associated with collisions in images. These features could include broken glass, dents or bends in the vehicle chassis, deployed airbags or other visually identifiable features.

Furthermore, motion sensors could comprise any kinds of motion sensors known in the art. These may include, but are not limited to: passive infrared sensors, microwave sensors, and ultrasonic sensors. Motion sensors could be deployed at selective locations in a vehicle. In some embodiments, motion sensors could be used to detect vibrations from a vehicle collision. Other sensors can include sensors for detecting driving conditions. Driving conditions can be inferred from sensory information retrieved from gyroscopes, accelerometers, and wheel speed sensors, as well as possibly from other sensors. By analyzing vehicle acceleration, orientation, angular velocity and wheel speed, a computing system may be able to detect if a collision has likely occurred. Other sensors may include devices such as laser rangefinders, radar, global positioning system (GPS), cameras (including infrared), and radio frequency identification transceivers. Such sensor devices may be used to determine the vehicle's attitude, position, heading, velocity, location, acceleration, operation history, and the like. Sensor systems may also be used to sense objects around the vehicle 200, such as other vehicles, pedestrians, bicyclists, buildings, traffic signs, traffic lights, intersections, bridges, and the like.

Some embodiments can also include crash sensors. Vehicles can include crash sensors that are used for various purposes. For example, an onboard computer may monitor crash sensors to determine when to deploy one or more airbags, or enable other safety systems, as well as the deployment of the beacon devices/drones. In some embodiments, a computing system could have access to sensed information from crash sensors through an onboard diagnostics system.

In different embodiments, the onboard computing system 210 of vehicle 200 may be configured to communicate with one or more remote systems over a network (not shown in FIG. 2). The network could comprise any wide area network, local area network or other suitable network. In some cases, network may be the Internet. The onboard computing system 210 may communicate, for example, with one or more external database systems. An external database system can include a server (including processors and memory) and a database, and the external database system may store various kinds of information, including, but not limited to: navigation information, geospatial information, road conditions (for example, real-time traffic patterns), weather information (including, for example, rain, snow, ice and/or flooding forecasts), as well as other kinds of information. It may be appreciated that onboard computing system 210 may both send and receive information to and from these remote databases. Moreover, it may also be appreciated that in other embodiments, one or more of these databases (or parts of the databases) could be locally disposed within vehicle 200.

As seen in FIG. 2, the vehicle 200 further includes a driver interface system 240. The driver interface systems 240 may be used to interface with driver 202 or other occupant of the vehicle. To achieve this interface, the interface systems may include input and output devices including but not limited to keyboards, touchscreens, microphones, scroll wheels, displays, speakers, and haptic systems. Driver interface system 240 may be configured to display or otherwise present options and settings as well as information about external road conditions around the vehicle 200 or other motor vehicles traveling on the roadways. For example, some aspects of the driver interface system 240 can be presented via a vehicle display screen 206. In other embodiments, a mobile device such as a tablet or mobile phone can be configured to present aspects of the driver interface system 240. In one embodiment, the driver interface system 240 can be configured to allow the driver 202 to (manually) trigger deployment and/or retraction of the beacon drone when desired. In such cases, the driver interface system 240 can connect to a drone deployment module ("deployment module") 270 that is configured to transmit control commands to the enclosure housing and drone 290 to perform various operations for deployment and stowing of the drone 290. In different embodiments, a battery 292 is also available in the car that powers the onboard computing system 210 and can supply power to a deployed drone via tether.

In different embodiments, the deployment module 270 is or incorporated in an intelligent system that is implemented, managed, or maintained by the onboard computing system 210 with reference to sensor systems and interface systems, as discussed above. The onboard computing system 210 may also include control systems configured to use or otherwise respond to the data gathered by the sensor systems to control features the vehicle, such as side drone deployment.

Figure 3:
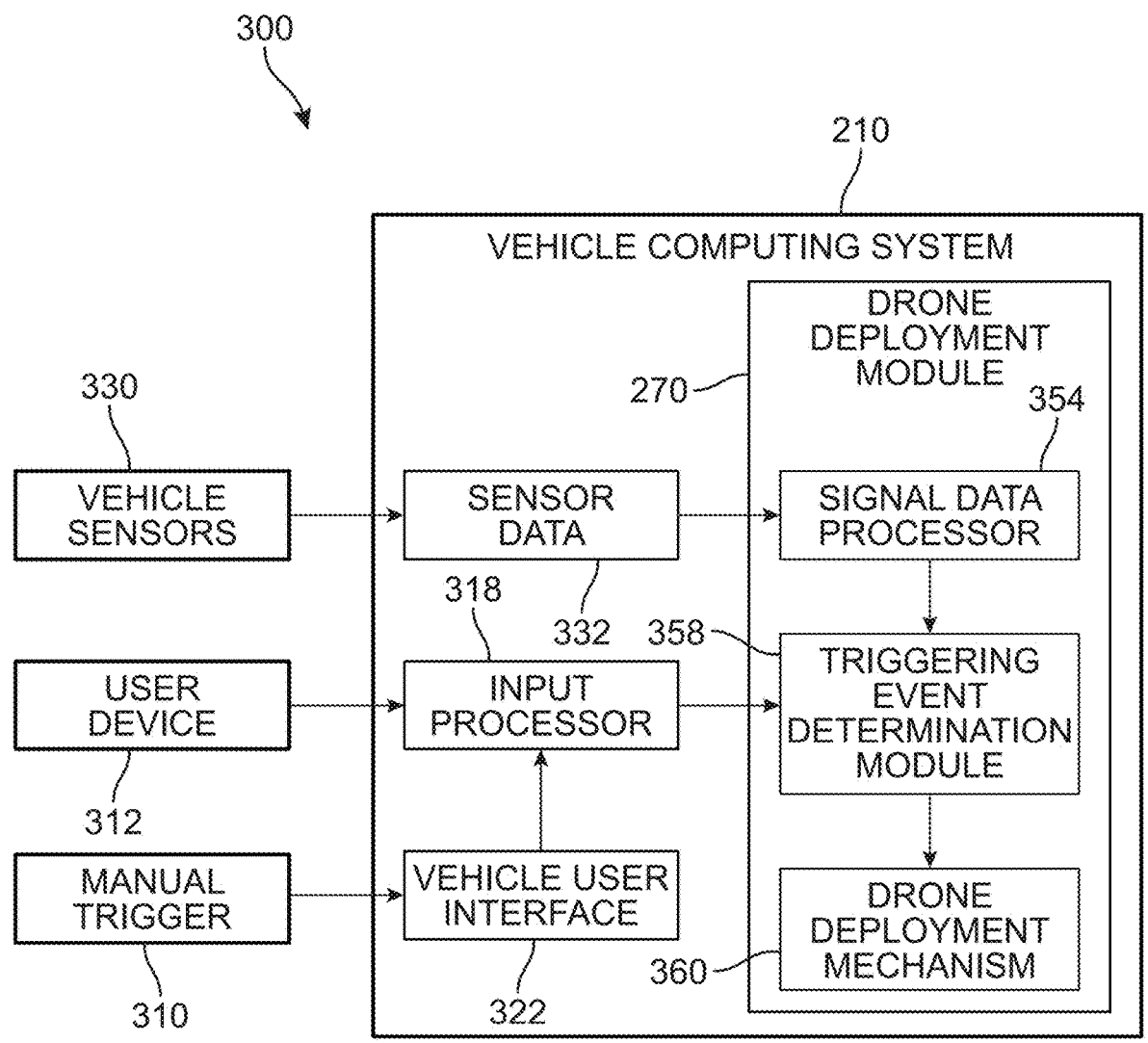
FIG. 3 is a flow diagram of a process of a triggering event causing the deployment of a drone from a vehicle, according to an embodiment.

In FIG. 3, an embodiment of a schematic process diagram of a vehicle beacon system 300 is depicted. It can be seen that in different embodiments, deployment of the drone can be initiated manually and/or automatically. In the case of a manual initiation, a user may select an option for a manual trigger 310 via an interface provided via a user device 312 (e.g., a mobile phone) or through a vehicle user interface 322. Thus, communications may optionally be established between vehicle computing system 210 and user device 312. The manual trigger 310 may be submitted in cases of an accident having occurred, or simply due to the driver becoming lost or having a car breakdown, and/or it may be desired for other purposes. In some embodiments, the user may also submit a request that causes a disabling or retracting the drone. The manual trigger 310 command is received by an input processor 318 of the vehicle computing system 210, which conveys a signal to a triggering event determination module 358 of deployment module 270. The system is configured in such cases to respond by deploying the drone via a drone deployment mechanism 360.

In the case of an automated initiation, the triggering event will correspond to one or more sensor data 332 received via vehicle sensors 330 indicating a likelihood of an accident. Vehicle sensors 330 can measure a parameter related to the vehicle or the surrounding environment. In one embodiment the vehicle has an onboard diagnostic (OBD) system included in or connected to vehicle computing system 210. The OBD may be a system configured to continuously monitor various aspects of a vehicle such as the powertrain, emissions, chassis, and body of the vehicle, as well as other vehicle aspects. The OBD can be monitoring various automotive sensors built within the vehicle. In the automotive industry there is an industry wide standard for OBD computers, and what the OBD system monitors, known as OBD-II. These standard sensors provide data relating to various vehicle systems including the engine, transmission, chassis, and other vehicle systems. In one embodiment the activation sensor(s) are sensors already incorporated in the OBD. In another embodiment one or more of the sensors are separate from the OBD.

For purposes of this application, an activation sensor refers to a sensor that captures data that can be utilized by the triggering event determination module 358 to cause an activation of the drone deployment mechanism 360. The activation sensor may be an accelerometer or other types of sensors such as one or more of a velocity sensor, a temperature sensor, a pressure sensor, a decibel meter including a microphone, an angular position sensor, a location sensor (such as GPS), a linear position sensor, a rotational motion sensor, an inertial sensor, or another type of sensor capable of measuring a parameter that may indicate if a vehicle accident or breakdown has occurred. In one embodiment, the activation sensor may be a microphone or decibel meter and the activation threshold may be a certain decibel level, a change in decibel level measured over a certain period of time, a frequency spectrum, and/or magnitude predetermined to likely indicate and accident in progress or about to occur. For instance, a vehicle may slam on the brakes causing tires to screech against pavement. The decibel meter may measure this screech noise to see if it exceeds an activation threshold and, in response, the triggering event determination module 358 may send an activation signal to the drone deployment mechanism 360 to activate and deploy the drone. In another embodiment, the activation sensor may be a pressure sensor. The pressure sensor may measure force per unit area or other force metrics. If another vehicle hits the vehicle, the pressure sensor would measure the change in force and result in an activation signal being generated that causes the drone to be released and deployed. Thus, in some embodiments, the triggering event determination module 358 can include a damage detection module that identifies conditions that have been designated as accident or emergency conditions.

In different embodiments, a signal data processor 354 of the deployment module 270 receives and analyzes the sensor data 332 to determine that the likelihood that an accident occurred has exceeded a threshold. For example, the sensor data may relate to an airbag being activated, to car damage being detected, to an acceleration (including a deceleration) that exceeds an acceleration threshold, and/or any other data that might be indicative of an accident. Alternatively, the data may instead be an internally generated signal based on measurements and analysis internal to the vehicle computing system 210. In some embodiments, the vehicle computing system 210 can be configured to set an activation threshold for each of the activation sensor(s). The activation sensor will, either continuously or periodically, measure the parameter. If the activation threshold is not met the activation sensor will continue to monitor the parameter. If the activation threshold is met, vehicle computing system 210 will activate or deploy the drone.

As one non-limiting example, vehicle sensors 330 may include an accelerometer that may be used to measure the acceleration and deceleration of a vehicle. In one embodiment, if a sensor detects a measurement that meets an activation threshold it can send an activation signal to the deployment module 270. In the current embodiment, the threshold may be a certain deceleration. If the vehicle's speed decreases a threshold amount in less than or equal to a specified period of time, the triggering event determination module 358 determines an accident is imminent or has occurred. In response to such a determination, the drone deployment mechanism 360 will be activated. As an example, the triggering event determination module 358 threshold may be set for −12 meters per second squared ($m/s^2$). In one example scenario, the vehicle 100 may be traveling at 50 kilometers per hour (km/hr) and the vehicle's operator notices a stopped vehicle. The vehicle's operator applies the brakes and starts slowing down at a rate of −12.5 $m/s^2$. The accelerometer would detect that −12.5 $m/s^2$ exceeds the activation threshold of −12 $m/s^2$ and then a sudden stop event could lead to the triggering event determination module 358 to send the signal to activate the drone deployment mechanism 360. Thus, in some embodiments, the drone deployment mechanism 360 includes a processor or switch capable of receiving an activation signal from the triggering event determination module 358. In one example, after the processor receives an activation signal, the processor activates the drone deployment mechanism 360. The drone may then immediately pop-out from its housing to begin its beacon to attract attention of anyone in the area and bring help to the scene.

In another example embodiment, the system may be triggered based on data received from multiple and varied sensors. As an example, vehicle computing system 210 may be in communication with a pressure sensor, an accelerometer, and a decibel meter. In this embodiment each sensor has an activation threshold based on the parameter the sensor is designed to monitor (force/unit area, m/s2, and decibel level respectively). A single sensor measuring its corresponding activation threshold may trigger an activation threshold. In another embodiment, the triggering event determination module 358 may require two or more sensors to meet the activation threshold before triggering the drone deployment. If the system requires two or more activation signals the system may prevent false signals and prevent unwanted deployments. In another example, a vehicle may include multiple pressure sensors at varying points in the vehicle's body. A vehicle may require multiple pressure sensors, accelerometer, or other types of sensors in order to accurately determine if an accident is occurring. A system with multiple types of sensors would still be effective in the event of failure of one of the sensors.

Those skilled in the art will appreciate that other triggers and sensors may be used in the system. The system is not limited to accelerometers, decibel meters, and/or pressure sensors. The system may be triggered by one of the vehicles safety systems being deployed such as the use of anti-lock brakes or the air bags being deployed. Alternatively, the system could be triggered using a distance sensor such as a laser range finder, an ultrasonic sensor, an infrared sensor, or some other type of distance sensor. Other systems triggers could be used such as a system that monitors driver alertness or that monitors for objects in the vehicles path. In another embodiment, the system contains a light sensor that can detect vehicle brake lights of vehicles traveling in front of the monitoring vehicle. Furthermore, as noted above, the driver could also manually trigger the monitoring system using a button, a voice command, their mobile device, the vehicle's user interface, or some other manual trigger. Those skilled in the art will appreciate that a multitude of other sensors and triggers could be used and the embodiments are not limited to the listed sensors.

Figure 4A:
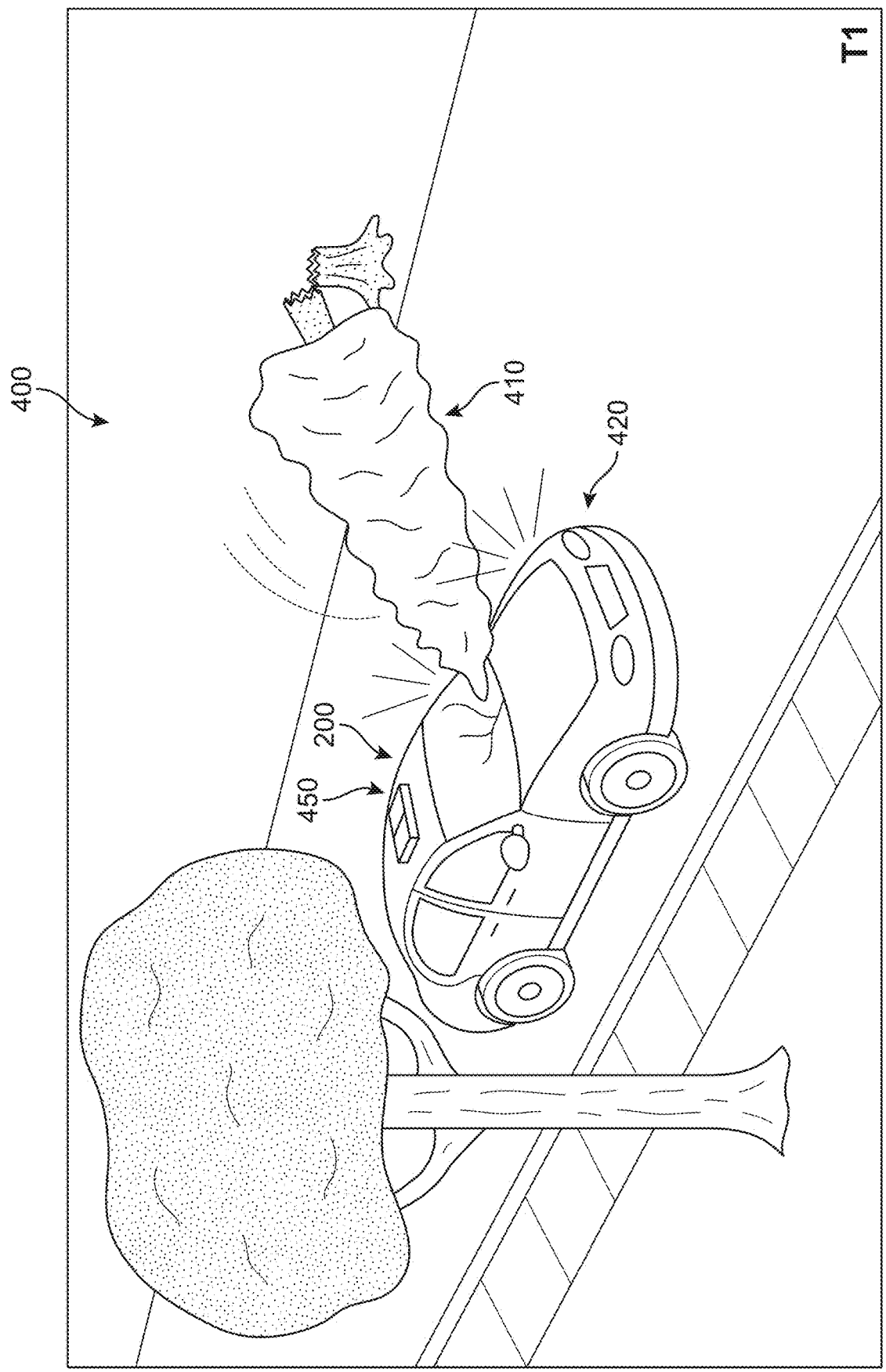
FIGS. 4A, 4B, and 5 are a sequence illustrating an example a drone deployment system in which the drone is released from a compartment formed in an exterior of the vehicle, according to an embodiment.

For purposes of clarity to the reader, one scenario in which the proposed systems and methods may be implemented is depicted in the sequence of FIGS. 4A, 4B, 5, 6, 7, and 8. In FIG. 4A, a second car 420 is illustrated at a location 400 just as it is struck by a falling tree 410 at a first time T1. Second car 420 can be understood to include an embodiment of the vehicle beacon systems. An exterior of the roof of the passenger compartment of second car 420 includes a compartment 450. A forward portion of the second car 420 is crushed by the impact of falling tree 410. Sensor data collected by sensors installed in and around the second car 420 register the impact and cause an activation signal to be generated that triggers a deployment of a drone-beacon from its compartment 450.

Figure 4B:
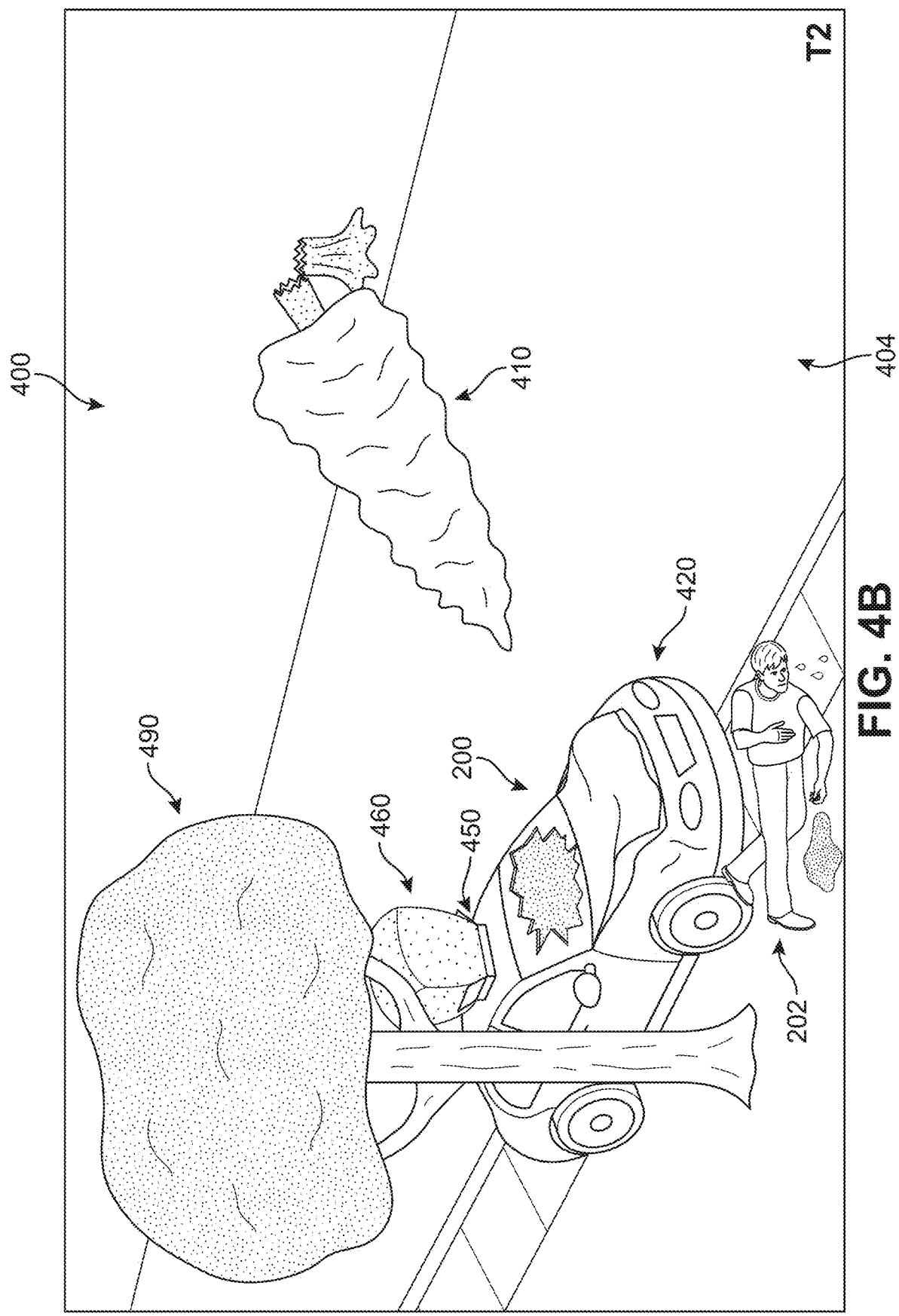

This response is represented by FIG. 4B, where at a second time T2 following the first time T1, even while the second car 420 is skidding into another obstacle shown as tree 490, the deployment process is initiated. In this scenario, the driver 202 has also been ejected from the second car 420 due to the force of the impact with tree 490 and is lying on the ground several feet from the second car 420, away from road 404. The compartment 450 can be rigged to slide open and/or pop open, and a drone-based beacon ("beacon") 460 is released.

Figure 5:
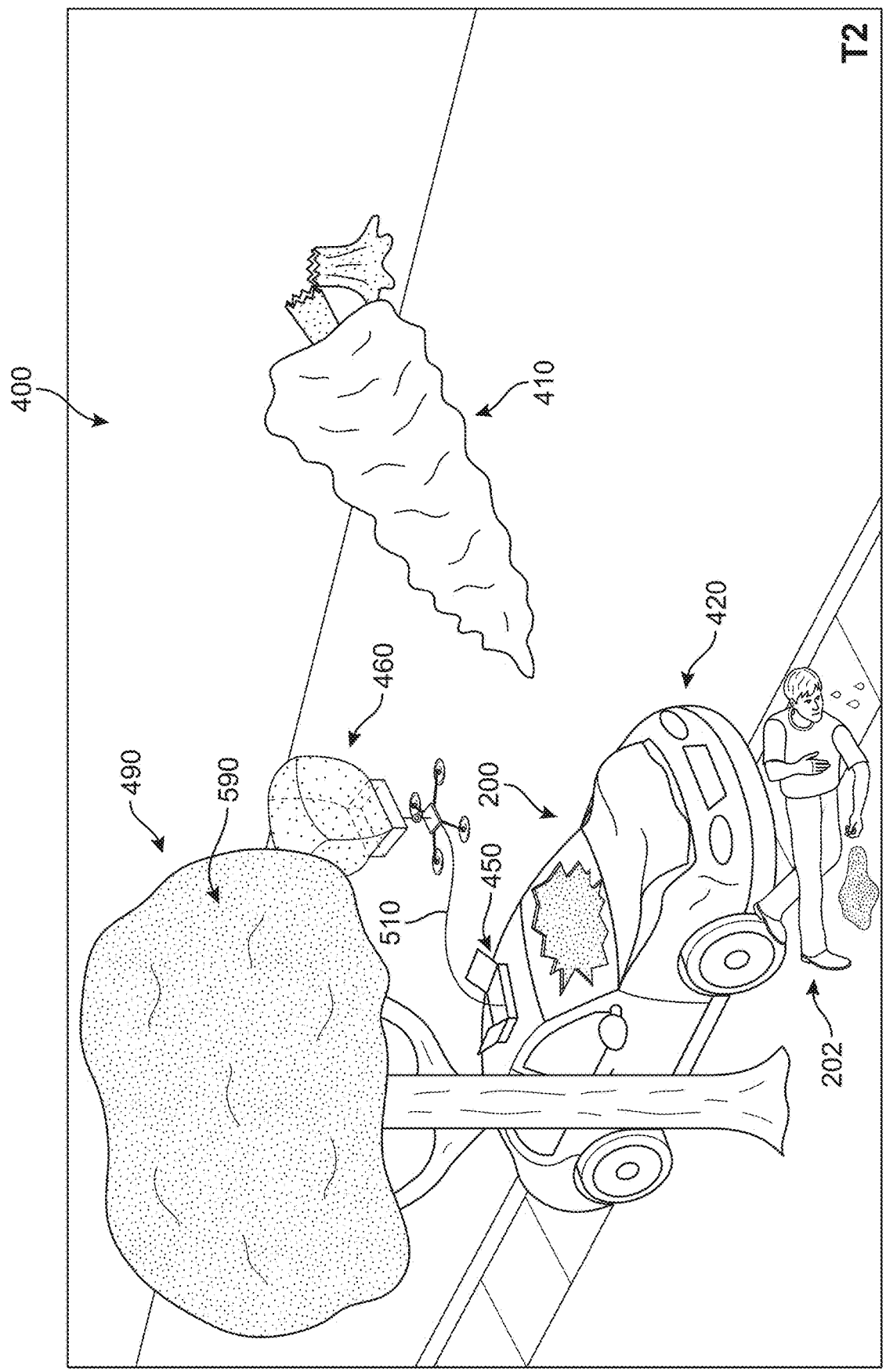

Moving to a third time T3 shown in FIG. 5, the process by which the beacon 460 emerges from the compartment 450 is depicted. In different embodiments, the beacon 460 can include sensors that detect nearby obstructions (such as foliage 590 of the tree 490) that might block or hinder its upward progress. Upon detection of such obstructions, the navigation system for the vehicle computing system can route the drone such that it detours around the obstacle until it can continue moving upward while maintaining its physical connection via tether 510. In different embodiments, tether 510 can comprise a power cable with a low enough thickness and weight to minimize drag (which would require more power to be pumped through to the drone to keep it airborne and would limits the ability to add new features such as sensors or high-resolution video cameras to the drone body). Some cables for tethered drones include one or more fiber optic elements for communications, and/or materials such as Kevlar®, Vectran®, Spectra®, Dyneema®, and other materials, including braided materials, that allow for the transfer of power and data between the ground vehicle and the airborne beacon.

In FIG. 5, the beacon 460 is shown as comprising a UAV that includes gas bags(s) filled with lifting gases powered with propellers and controlled through rudders. For purposes of this disclosure, such a drone may also be referred to as an aerostat. Aerostats are lighter than most other types of UAVs, and typically refer to unpowered balloons or dirigibles that gain lift through the use of a buoyant gas. Dirigibles are lighter-than-air aircraft, such has an airship or dirigible balloon, that can navigate through the air under its own power. Dirigible UAVs may gain their lift from a gas bag(s) filled with a lifting gas, such as hydrogen or helium, that is less dense than the surrounding air. Similar to rotary-wing UAVs (see below), dirigible UAVs may be employed to hover within a proximity of a fix position. However, dirigible UAVs generally use a more limited amount of energy than either rotary-wing or fixed-wing UAVs.

Figure 6:
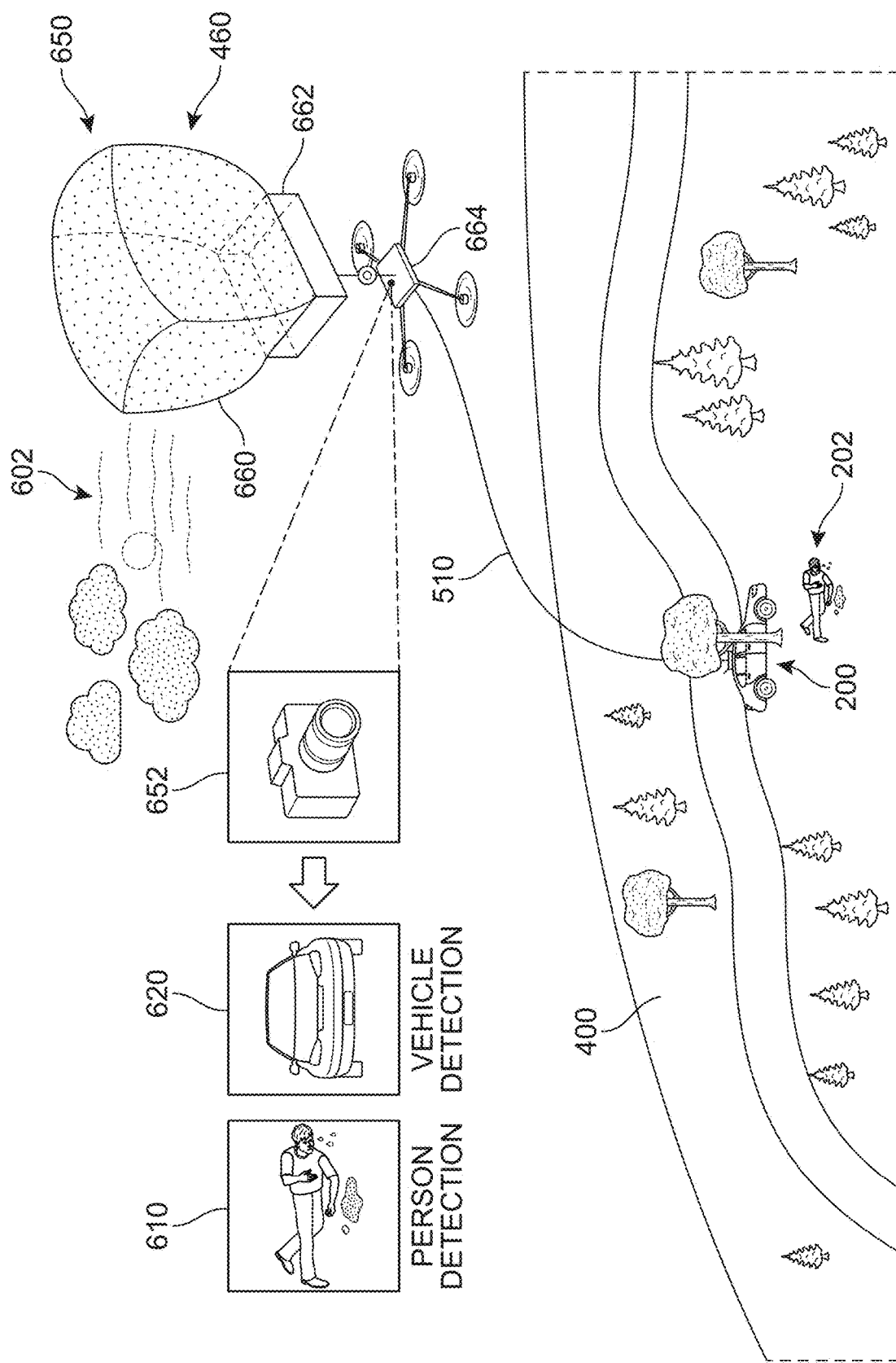
FIGS. 6 and 7 depict an example whereby the drone can be repositioned dynamically in response to sensor data, according to an embodiment.
Figure 7:
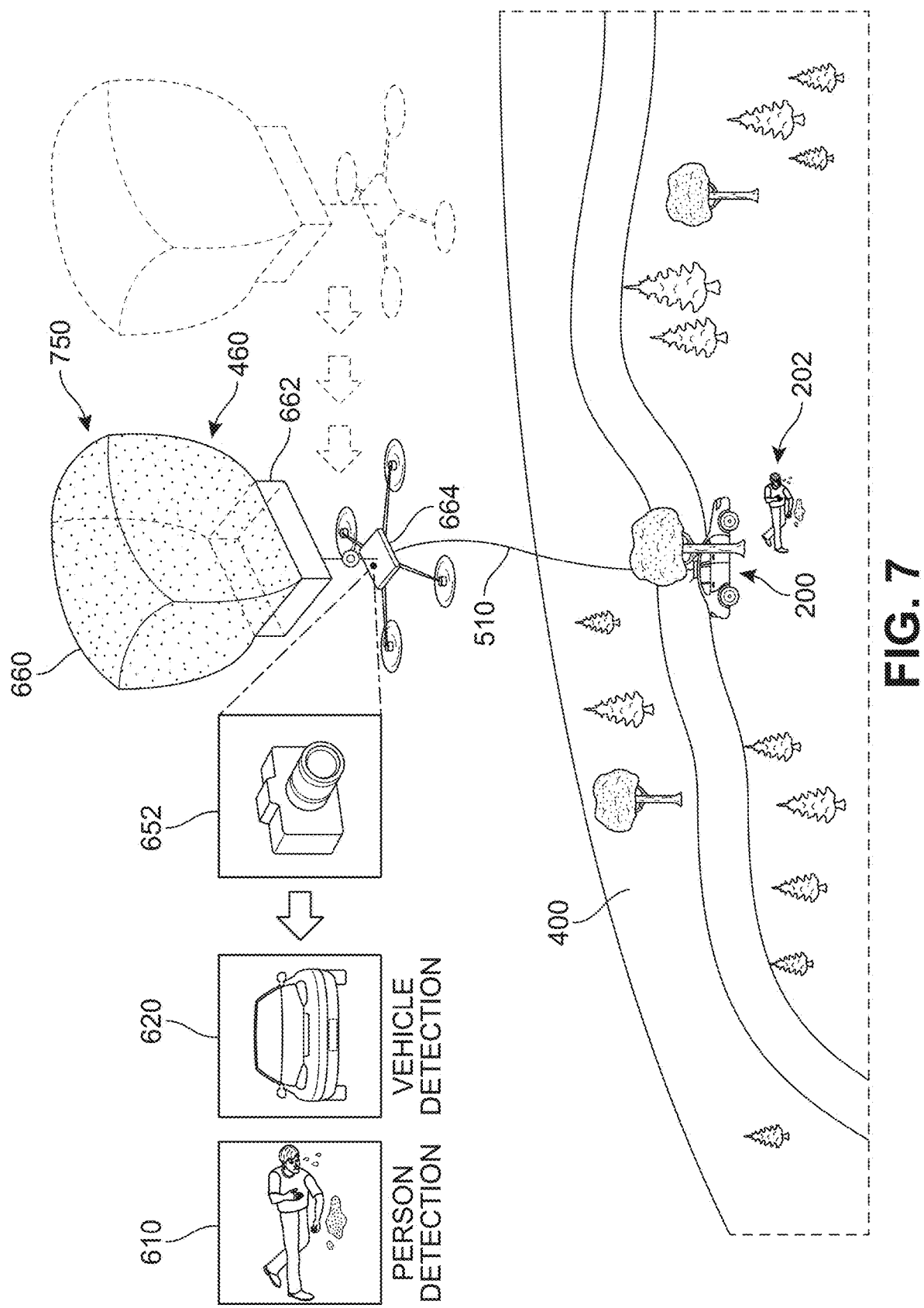

In some embodiments, a dirigible UAV as shown in the beacon 460 of FIGS. 5, 6, and 7 may comprise one or more gas bags filed a lifting gas coupled to a rudder to steer the UAV and a propeller of some form to provide motion. The propeller may be coupled to an engine, which may include, but is not limited to, an internal combustion or solar powered engine, to provide power to the propeller. Additionally, dirigible UAVs may contain a mechanism to release or filled the gas bag(s) with the contained lifting gas. Such a mechanism may be coupled to a compressor that contains the appropriate lifting gas under pressure. In some examples, a dirigible UAV may be free floating. In some embodiments, the mechanism can be activated or triggered via the activation signal generated by the vehicle's onboard computing system following detection of a collision or other emergency situation.

As shown in the drawings, in some examples, an aerostat UAV may be anchored to the ground vehicle and connected to its power source by, for example, one or more tethers. In such examples, the anchors/tether can be employed to steer (e.g., wrench) a respective aerostat UAV into position. In some embodiments, dirigible UAVs may optionally include a height sensor, a processing unit, a compressed lifting gas storage device, an intake valve, and a release value. The height sensor may determine a height and, based on instructions received from a relay control device (at the vehicle's computing system) may determine, though the processing unit, to increase the buoyancy of the UAV by filling, though the intake value, the gas bag(s) with a determined amount of the lifting gas contained within the lifting gas storage device. Alternatively, the processing unit may determine, based on the received instructions, to decrease the buoyancy of the UAV by releasing a determined amount of lifting gas from the gas bag(s) though the release value.

In other embodiments not illustrated in the drawings, the engines for the drone may include internal combustion engines that consume various forms of fuel or use solar energy collected using on-board solar panels. In other embodiments, the beacon 460 can alternatively comprise a fixed-wing type UAV that includes a rigid wing that has a predetermined airfoil, which make flight capable by generating lift caused by the UAV's forward airspeed. This airspeed is generated by forward thrust by the means of, for example, a propeller being turned by an internal combustion engine or electric motor, or a jet engine. Control of this type of UAV comes from control surfaces built into the wing itself, these may also include ailerons, an elevator, and a rudder. The elevator controls the pitch (lateral axis). The ailerons control the roll (longitudinal axis). The rudder controls the yaw (vertical axis). A fixed-wing aircraft, such as, for example, a kite or glider, may also glide on moving air. Variable-sweep wing aircraft as well as aircraft that employ wing warping are also considered fixed-wing UAVs.

In still other embodiments, the beacon 460 can comprise UAVs that are rotary-wing type aircraft. A rotary-wing type UAV includes one or more rotor blades or wings that revolve around a fixed mast. During flight, the fixed mast revolves many times per minute. A rotary-wing UAVs obtains lift resulting from the constant movement of the rotor blades rotating around the mast producing the required airflow over blades. Rotor blades may be airfoil-shaped, or they may have a flatter slope. The entire assembly of rotor blades and fixed mast is called a rotor. The number of rotor blades and rotors on a given UAV may vary. In some cases, an additional engine is used either for upward lift or forward thrust to reach greater heights and speeds. Rotors may be setup in various configurations. For example, a tricopter has twin rotors on each arm, one pointing upwards and one pointing downwards whereas an X8 consists of a quadcopter with twin motors on each arm. Other common types of rotary-wing UAV include helicopters, cyclocopters, autogyros, and gyrodynes.

In different embodiments, the drone can also represent a camera or other sensor system or housing that is attached to a balloon or parachute or be attached to a flying apparatus such as a drone, blimp, plane, or glider. In one embodiment of the vehicle beacon system, additional information related to the physical characteristics of the vehicle and/or passengers can be recorded on the video or attached to the video data. The additional information may include date, time, vehicle identification number, license plate number, make of the vehicle, model of the vehicle, color of the vehicle, or other physical characteristics, as well as an assessment and identification of the passengers' general condition (conscious/unconscious, stationary/ambulatory, sitting/standing/lying down, verbal/nonverbal, child/adult, injury/no injury, etc.) based on the collected sensor data. This information can then be communicated to emergency responders.

Moving now to FIGS. 6 and 7, an example implementation of the vehicle beacon system's ability to establish an accurate position with respect to its vehicle and any passengers is provided. In FIG. 6, the beacon 460 has flown or floated upward to a height of up to about 400 feet, depending on the radius of visibility desired and the length of available tether. For example, if onboard sensors indicate that the vehicle has crashed in a rural area/remote region that is less likely to be noticed the drone could be instructed vehicle computing system to fly higher in order to have a larger/wider radius from which it may be observed. On the other hand, if sensors indicate the vehicle is in high-traffic or urban areas, the drone could be instructed by the vehicle computing system to fly lower with a smaller radius where it can be observed and attract the nearest emergency responders.

It can be seen in FIG. 6 that beacon 460 includes a gas-filled bag 660, a housing 662 for sensors, processors, and other components, and a rudder or propeller 664. As it reaches a target height, its sensors (e.g., camera(s)) collect data for the outer environment, in particular as captured image data 652 for the ground below. This image data 652 is transmitted to the vehicle computing system (e.g., via tether) and evaluated using image recognition techniques to perform detection and identification of objects of interest below, such as human persons detection data 610 and vehicles detection data 620. In some embodiments, the detection can be precise enough that the vehicle to which it is tethered can be specifically identified (in case there are multiple vehicles in the area). In some embodiments, the beacon 460 can include a projector or laser system that can display various symbols against the sky. In some embodiments, the symbol that is selected by the vehicle's computing system for presentation to observers can also be directly dependent on the sensor data that is collected and the objects detected and their condition. If a fire is present, a burning fire symbol can be projected/displayed in the sky near the drone. If a person is unconscious or too injured to move, a medical/ambulance symbol can be presented. If a car has broken down, a mechanic or tow truck symbol can be presented. If a car has fallen into water, a flood warning symbol can be presented.

As a general matter, image processing techniques can include various image processing algorithms and/or software that may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework-Yolo1, Yolo2, Yolo3, and SSD. In some embodiments, machine learning techniques, such as deep learning that includes classification, clustering, and/or other techniques, are applied to the data captured by the beacon's sensor to perform pattern recognition within the image data, or to perform other types of analysis. For example, a neural network and/or classification technique may be used to train a model that is a classifier and that is useable to detect different types of injuries. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAl, and BigSur.

In different embodiments, the detection and classification of objects in the area below the drone can be used to provide continuous feedback to the navigation system in order to keep or steady the position of the beacon 460 relative to the vehicle and/or driver. In FIG. 6, a strong wind 602 is shown pushing the beacon 460 in a direction away from the vehicle 200, so that the beacon 460 is no longer directly above the vehicle 200 but is instead offset with respect to a vertical axis and is instead in a first position 650 that can be up to 300 feet off-center from vehicle 200.

In FIG. 7, as vehicles detection data 620 is obtained and processed, the vehicle computing system recognizes that the beacon 460 is not as effective or targeted for drawing help to a specific location as it should be. In response, the navigation system instructs the drone propeller 664 to reposition or maneuver itself using power provided by the vehicle power source via tether 510. The beacon 460 travels along the airspace (represented by a sequence of arrows) until achieving a second position 750 that is directly above, or within some pre-set acceptable radius of, the vehicle on the ground below.

Figure 8:
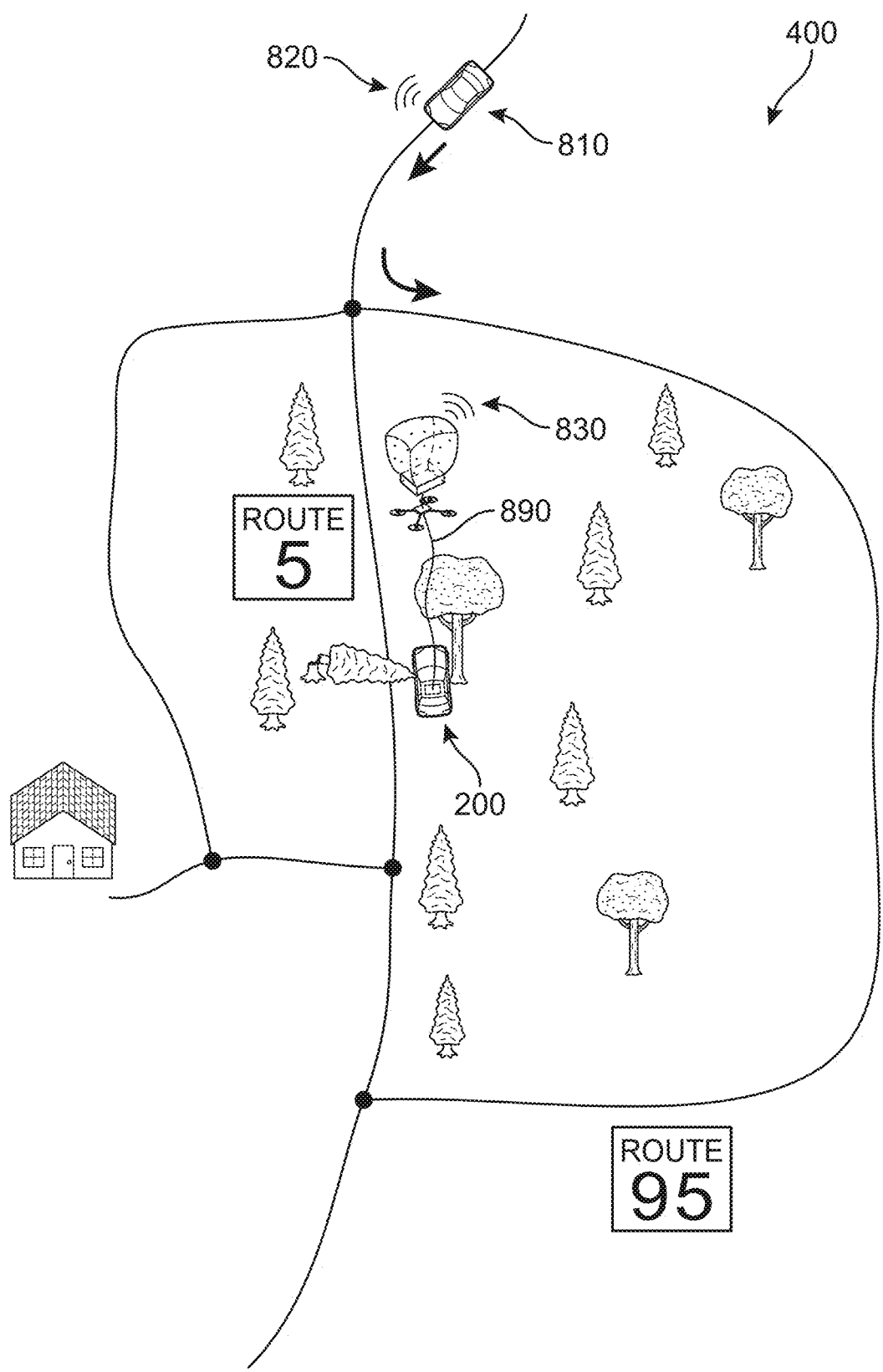
FIG. 8 is a bird's-eye view of the vehicle accident scene showing the visibility of the drone to third-parties, according to an embodiment.

A rescue scenario is depicted in a bird's eye view of area 400 in FIG. 8. In this top-down view of the accident scene, the second car 200 is barely visible, and the driver cannot be seen at all. However, the beacon 460 can be perceived by human eye from a distance, including from the seat of a third car 810 traveling down a road near the site where the second car 200 has been disabled. In some embodiments, the beacon 460 can generate a radio signal, audio signal, or visual presentation (signal 830) that can be detected by persons in the area, and/or via radio frequencies or other monitoring equipment 820 frequently used by first responders or other emergency personnel. In FIG. 8, the third car 810 can include an emergency responder unit who, having recognized the signal 830 transmitted from the beacon and/or spotted the beacon 460 itself in the sky, has been dispatched to the site. The second car 200 and the driver will then be assisted in a far more timely and responsive manner, which can mean the difference between life and death, or even paralysis and recovery, in cases of high-impact collisions. Furthermore, in some embodiments, the beacon 460 can emit a spotlight 890 via an onboard light device which can target the area below that was determined via image recognition processing to be the site of the driver's body.

In other examples (not shown here), the drone can include sensors that may generate, acquire, and/or receive other types of data (e.g., temperature data), such as temperature sensors. In general, the sensors can collect data that may be used for determining which features of the beacon should be activated (lights, sounds, navigation). For example, the computing system may use temperature data acquired by a drone temperature sensor to determine a proximity of a fire to the driver. In one embodiment, the one or more sensors may be smoke detectors or carbon monoxide detectors. In some embodiments, sensors may include imaging devices such as RADAR/LIDAR, smart cameras, infrared cameras, etc. It should be noted that the sensor data generated may be used in addition to or as an alternative to the image data that can be collected by the drone.

Figure 9:
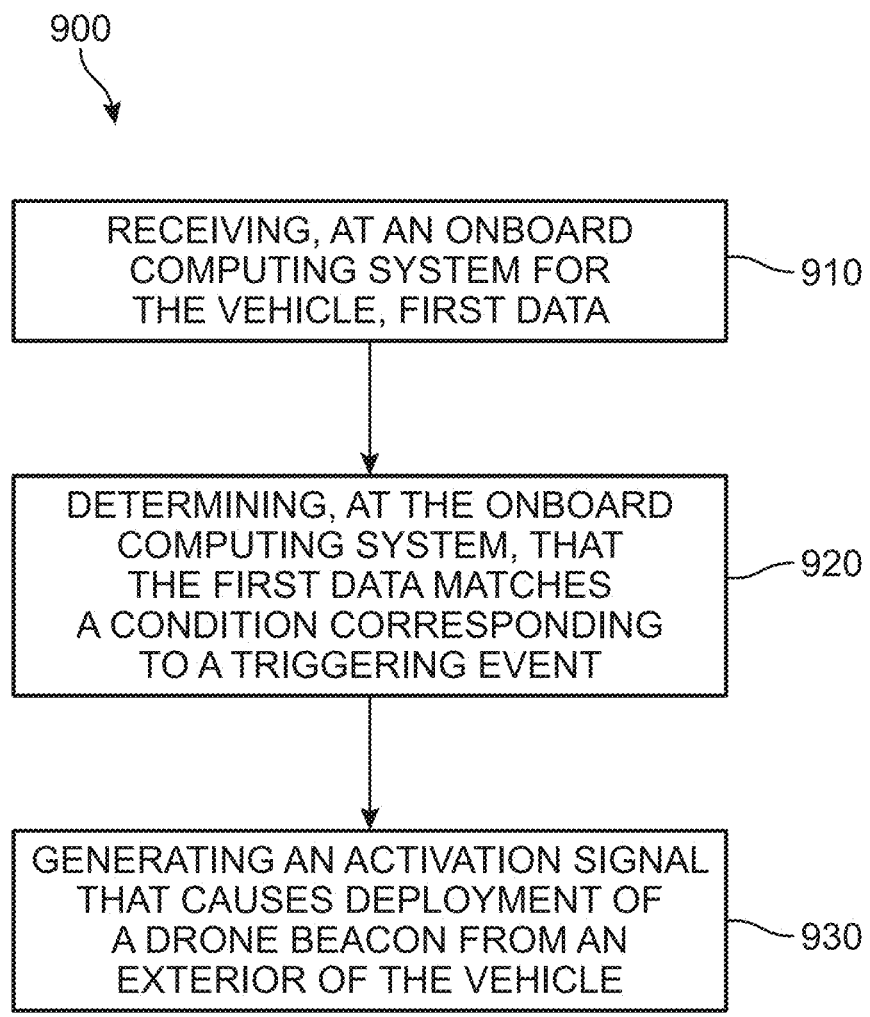
FIG. 9 is a flow chart depicting a process of triggering deployment of a drone beacon from a vehicle, according to an embodiment.

FIG. 9 is a flow chart illustrating an embodiment of a method 900 of triggering deployment of a drone-based beacon from a vehicle (e.g., in response to conditions indicating a vehicle collision has occurred). The method 900 includes a first step 910 of receiving, at an onboard computing system for the vehicle, first data. A second step 920 includes determining, at the onboard computing system, that the first data matches a condition corresponding to a triggering event. The method 900 also includes a third step 930 of generating, at the onboard computing system and in response to determining a triggering event has occurred, an activation signal that causes deployment of a drone beacon from an exterior of the vehicle.

In other embodiments, the method may include additional steps or aspects. In one example, the drone beacon is released from a compartment formed along the exterior of the vehicle. In another example, the first data includes information indicating a collision has occurred. In some embodiments, the first data corresponds to a first user input requesting the deployment of the drone beacon. In another embodiment, the method also includes steps of receiving, at the onboard computing system, a second user input requesting a retraction of the drone beacon; and retracting, in response to receiving the second user input, the drone beacon. In some embodiments, deployment involves releasing a tether cable connecting the drone beacon to the onboard computing system, the tether cable providing the drone beacon with power. In different embodiments, the drone beacon is one of an aerostat drone, a fixed-wing aircraft drone, and a rotary-wing aircraft drone. In some embodiments, the drone beacon includes one or more sensors that capture data for the environment around the vehicle once the drone beacon has been deployed. In another example, the method also includes transferring data collected by sensors on the drone beacon to the onboard computing system via the tether cable. In some embodiments, the data is image data, and the method further includes identifying, at the onboard computing system, one or more objects in the image data including vehicles and people. In another embodiment, the method can include steps of generating, at the onboard computing system and based on the image data, navigation instructions for the drone beacon to hover directly over the vehicle; and transmitting the navigation instructions to the drone beacon via the tether cable, thereby causing the drone beacon to move toward and align itself along a vertical axis with the vehicle.

It is appreciated that methods in accordance with the present disclosure can include any combination of the aspects and features described herein. That is, methods and systems in accordance with the present disclosure are not limited to the combinations of aspects and features specifically described herein, but also include any other combination of the aspects and features that can be implemented.

In different embodiments, the disclosure also provides for a vehicle beacon system. The vehicle beacon system can include a vehicle with an onboard computing system, and one or more collision detection sensors; a drone beacon housed in a compartment formed along an exterior of the vehicle; and a tether cable connecting the onboard computing system to the drone beacon. In some embodiments, the drone beacon includes a gas bag filled with lifting gases that is powered with propellers and controlled through rudders. In another embodiment, the onboard computing system generates instructions for the drone beacon's operation and transmits the instructions to the drone beacon. In some embodiments, the instructions are generated based on sensor data collected by sensors installed on the drone beacon and transmitted to the onboard computing system. Other features and components of the system can include those aspects described herein.

As described herein, in one embodiment, the system may be implemented using a computer housed within a vehicle. The system can incorporate an activation sensor to detect a vehicle accident. The activation sensor can measure a parameter related to the vehicle or the surrounding environment. The activation sensor may be an accelerometer that may be used to measure the acceleration and deceleration of a vehicle. If the activation sensor detects a measurement that meets an activation threshold it will send an activation signal to the computer. The vehicle's computer may then responsive to the activation signal deploy the drone and activate a data monitoring system that collects and processes data via sensors installed on the drone body. In different embodiments, sensors on the drone may include a video camera, a still camera, a microphone, or any other device capable of recording data. Such sensors can include a processor or switch capable of receiving an activation signal from the computer. After the processor receives an activation signal the processor activates the video camera or other drone sensor. The sensor may begin monitoring and recording the surrounding environment. The camera on the drone could for example record an area consisting of the 360° surrounding the vehicle.

In some embodiments, the vehicle computer can run a program (such as a set of instruction stored on a memory and being executed by a processor) that controls the activation sensor and the drone sensors. The program detects the activation signal from the activation sensor and sends a second activation signal to the drone sensor(s). The program, for example, may receive captured video from a drone camera for image processing and object recognition/classification. The program may also control a transceiver for transmitting the video and other data to a remote server using a network. The transceiver may transmit the video to the network in real-time (i.e., the video may be streamed live to the server). In one example, the video may be transmitted in real time in order to preserve the video in the event the vehicle or portions of the drone are heavily damaged for purposes of preservation and reference by emergency personnel.

In one embodiment the drone sensor can comprise a single video camera that captures a 360° panoramic view of the area surrounding a vehicle. In some cases, the camera may be mounted below the drone body, to ensure the drone body does not occlude the field of view. The camera or cameras may be high resolution cameras in order to facilitate larger area capture and visibility. The camera or cameras may be a high-speed camera in order to capture high speed video and create a more detailed evidentiary record. The camera or cameras may also incorporate a zoom to capture areas further away from the accident site and detect emergency responder personnel. In different embodiments, the drone may incorporate a camera or cameras designed to swivel and tilt.

Thus, in the inactive/undeployed state for the vehicle beacon system, the computer can passively monitor the vehicle's condition. The activation sensor can continually measure its designated parameters. If the activation threshold is not met the activation sensor will continue to monitor the parameter. If the activation threshold is met, the computer will activate the camera and transceiver. The transceiver may be activated at the same time as the camera in order to facilitate real time transmission of the video. In different embodiments, the activation sensor can be utilized to activate other data recording devices.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random-access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random-access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of triggering deployment of a drone-based beacon from a vehicle, the method comprising:
   receiving, at an onboard computing system for the vehicle, first data;
   determining, at the onboard computing system, that the first data matches a condition corresponding to a triggering event;
   generating, at the onboard computing system and in response to determining a triggering event has occurred, an activation signal that causes deployment of a drone beacon from an exterior of the vehicle; and
   having the drone beacon project a symbol against the sky indicative of the triggering event.

2. The method of claim 1, wherein the drone beacon is released from a compartment formed along the exterior of the vehicle.

3. The method of claim 1, wherein the first data includes information indicating a collision has occurred.

4. The method of claim 1, wherein the first data corresponds to a first user input requesting the deployment of the drone beacon.

5. The method of claim 4, further comprising:
   receiving, at the onboard computing system, a second user input requesting a retraction of the drone beacon; and
   retracting, in response to receiving the second user input, the drone beacon.

6. The method of claim 1, wherein deployment involves releasing a tether cable connecting the drone beacon to the onboard computing system, the tether cable providing the drone beacon with power.

7. The method of claim 6, further comprising transferring data collected by sensors on the drone beacon to the onboard computing system via the tether cable.

8. The method of claim 7, wherein the data is image data, and the method further comprises identifying, at the onboard computing system, one or more objects in the image data including vehicles and people.

9. The method of claim 8, further comprising:
   generating, at the onboard computing system and based on the image data, navigation instructions for the drone beacon to hover directly over the vehicle; and
   transmitting the navigation instructions to the drone beacon via the tether cable, thereby causing the drone beacon to move toward and align itself along a vertical axis with the vehicle.

10. The method of claim 1, wherein the drone beacon is one of an aerostat drone, a fixed-wing aircraft drone, and a rotary-wing aircraft drone.

11. The method of claim 1, wherein the drone beacon includes one or more sensors that capture data for the environment around the vehicle once the drone beacon has been deployed.

12. The method recited in claim 1, said symbol comprising at least one of a burning fire, ambulance, tow truck, or flood warning.

13. A vehicle beacon system, the system comprising:
   a vehicle with an onboard computing system, and one or more collision detection sensors;
   a drone beacon housed in a compartment formed along an exterior of the vehicle, said drone beacon further including a gas bag filled with lifting gases, propellers and rudders, said gas bag being selectively filled with the lifting gas or having the lifting as released therefrom in order to selectively increase or decrease the buoyancy of said drone beacon; and
   a tether cable connecting the onboard computing system to the drone beacon.

14. The system of claim 12, wherein the onboard computing system generates instructions for the drone beacon's operation and transmits the instructions to the drone beacon.

15. The system of claim 14, wherein the instructions are generated based on sensor data collected by sensors installed on the drone beacon and transmitted to the onboard computing system.

16. A system for triggering deployment of a drone-based beacon from a vehicle, the system comprising a processor and machine-readable media including instructions which, when executed by the processor, cause the processor to:
   receive, at an onboard computing system for the vehicle, first data;
   determine, at the onboard computing system, that the first data matches a condition corresponding to a triggering event;
   generate, at the onboard computing system and in response to determining a triggering event has occurred, an activation signal that causes deployment of a drone beacon from an exterior of the vehicle; and
   having the drone beacon project a symbol against the sky indicative of the triggering event.

17. The system of claim 16, wherein the drone beacon is released from a compartment formed along the exterior of the vehicle.

18. The system of claim 16, wherein the first data includes information indicating a collision has occurred.

19. The system of claim 16, wherein the first data corresponds to a first user input requesting the deployment of the drone beacon.

20. The system of claim 19, wherein the instructions further cause the processor to:
   receive, at the onboard computing system, a second user input requesting a retraction of the drone beacon; and
   retract, in response to receiving the second user input, the drone beacon.

* * * * *